(12) United States Patent
Pennell et al.

(10) Patent No.: US 6,910,179 B1
(45) Date of Patent: Jun. 21, 2005

(54) METHOD AND APPARATUS FOR AUTOMATIC FORM FILLING

(75) Inventors: Mark E. Pennell, Austin, TX (US); Anthony Martin, Los Altos, CA (US)

(73) Assignee: Clarita Corporation, Redwood City, CA (US)

( * ) Notice: Subject to any disclaimer, the term of this patent is extended or adjusted under 35 U.S.C. 154(b) by 0 days.

(21) Appl. No.: 09/436,973

(22) Filed: Nov. 9, 1999

Related U.S. Application Data

(60) Provisional application No. 60/107,791, filed on Nov. 10, 1998.

(51) Int. Cl.[7] .................................................. G06F 7/06
(52) U.S. Cl. ........................ 715/507; 715/508; 705/26; 705/42
(58) Field of Search ................................ 715/505, 506, 715/508; 709/311

(56) References Cited

U.S. PATENT DOCUMENTS

| | | | |
|---|---|---|---|
| 5,446,919 A | | 8/1995 | Wilkins |
| 5,794,259 A | | 8/1998 | Kikinis |
| 6,026,368 A | | 2/2000 | Brown et al. |
| 6,112,215 A | * | 8/2000 | Kaply ........................ 715/507 |
| 6,183,366 B1 | | 2/2001 | Goldberg et al. |
| 6,192,380 B1 | * | 2/2001 | Light et al. .................. 715/505 |
| 6,199,079 B1 | * | 3/2001 | Gupta et al. ................. 715/507 |
| 6,208,339 B1 | * | 3/2001 | Atlas et al. .................. 345/780 |
| 6,249,284 B1 | * | 6/2001 | Bogdan ....................... 345/764 |
| 6,297,819 B1 | | 10/2001 | Furst |
| 6,378,075 B1 | * | 4/2002 | Goldstein et al. ........... 713/200 |
| 2004/0167928 A1 | | 8/2004 | Anderson et al. |

FOREIGN PATENT DOCUMENTS

| | | |
|---|---|---|
| WO | WO 99/46701 | 9/1999 |
| WO | WO 01/90917 A2 | 11/2001 |

OTHER PUBLICATIONS

Pierre Maret, et al.; Multimedia Information Interchange: Web Forms Meet Data Servers; Proceedings of the IEEE International Conference on Multimedia Computing and Systems; vol. 2, Jun. 7–11, 1999, pp. 499–505; XP000964627; Florence, Italy.

Internet Citation: "Gator.com offers one–click shopping at over 5,000 e–commerce site today"; Jun. 14, 1999; XP002145278; Date retrieved: Jun. 28, 2001. URL:http://www.gator.com/company/press/pr061499b.html.

* cited by examiner

Primary Examiner—Stephen S. Hong
Assistant Examiner—Matthew Ludwig
(74) Attorney, Agent, or Firm—Squire, Sanders & Dempsey, L.L.P.

(57) ABSTRACT

A method and apparatus allowing for entry of form data in a browser. In the described embodiment, a browser automation program executes on the user's computer and communicates with a browser program in order to determine when forms are encountered.

55 Claims, 9 Drawing Sheets ecookie | history | cookies | order

The Order Form

Here's how it works. Fill out and submit the following form, making sure to properly fill in your credit card information. Or, if you prefer, you can print the form (using your browser's print option) and fax it to us at (609) 448-4079. Your order will be acknowledged via email or fax, and the cookies shipped within 24 hours.

Ship To Information

100

⦿ Mr.  ○ Mrs.  ○ Ms.
First Name: [        ] ~101
Last Name: [        ] ~101
Address (line1): [              ] ~102
Address (line2): [              ]
City: [              ]
State: [ ]
Zip: [   ]
Phone: [     ] ~103
Fax: [     ]
Email: [              ] ~104

Order Information

Send me [ ] dozen Choco'runes and [ ] dozen Almo'runes.
Please send them ⦿ priority (2-3days) ○ overnight.

I understand that I will be billed $12/dozen ecookies plus $3/dozen for priority shipping and $15/dozen for overnight shipping.

Credit Card Information/Bill To Information

First Name: [        ]
Last Name: [        ]
Address (line1): [              ]
Address (line2): [              ]
City: [              ]
State: [ ]

FIG. 1

GlobeSet Wallet resides on a cardholder's desktop computer, operating with popular browsers like Netscape Navigator and Microsoft Internet Explorer.

METHOD AND APPARATUS FOR AUTOMATIC FORM FILLING

This application claims the benefit of U.S. Provisional Application No. 60/107,791, filed Nov. 10, 1998.

BACKGROUND OF THE INVENTION

1. Field of the Invention

The present invention relates to the field graphical user interfaces and more particularly to a method for entering information into a form on a screen display associated with an electronic device.

2. Description of the Related Art

Many a site on the Internet's World Wide Web (hereafter "web site". "web page" or simply "site") require the entry of various information in order to gain full access to the site and the services offered by the site. For example, many commercial sites require a user to set up an account and, in doing so, to provide various levels of personal information. Typically, the information is relatively repetitive from site to site—e.g., name, address, telephone number, electronic mail (email) address, credit card number, etc. In some cases, the information must be entered each time the user attempts to use the site. In other cases, an account is actually set up for the user and maintained—the user needs only to enter the full information the first time the site is accessed.

An example of an account set up screen is provided in FIG. 1. The figure illustrates a screen shot 100 of a web site accessed via, for example, web browser software executing on computing device such as a personal computer. The web site provides for online ordering, in this particular instance, of cookies. As can be seen, the user is invited to complete the shipping and billing information by visiting each data field and entering the appropriate information (e.g., name 101, address 102, phone number 103, email address 104, etc.). Alternatively, at some web sites, the user may click on a button, hyperlink, etc., to log in and fill in ordering information automatically (presuming the user has a previously set up account.)

One method of addressing the inconvenience of repetitive data entry of account information is the so-called "wallet" technology. Using "wallets", a user may enter certain information (name, address, billing/credit card information) once and sites that run the particular wallet technology will be able to receive the information without requiring the user to reenter the data. Unfortunately, this technology requires sites to execute the wallet technology in order to allow a user to benefit from it. A diagram 200 illustrating a particular embodiment of the wallet technology is shown in FIG. 2.

One other method of addressing the inconvenience of repetitive data entry is the so-called "type-ahead" technology in which the user's computing system attempts to "remember" certain information and, if a user starts to type a sequence of characters using, for example, a keyboard or other character input device, the system attempts to recognize the character sequence and complete the sequence. For example, if the user named John Smith starts to type his name in a name field, the system may recognize the user is typing "John Smith" after the user has only typed "Joh" and automatically fill in the remaining "n Smith".

Unfortunately, the type ahead technology is limited in that it may or may not correctly recognize the phrase being typed and implementations are typically browser software dependent. Moreover, the type ahead technology requires the user to independently visit each field in a form, rather than filling in multiple fields with a single click.

Thus, it would be useful to provide a method and apparatus which reduces the inconvenience of repetitive data entry. It would be particularly useful to provide a method and apparatus which was not browser dependent and which did not require implementation by each individual web site in order to allow a user to benefit from it.

BRIEF SUMMARY OF THE INVENTION

A method and apparatus providing for improved automation for entry of data in forms displayed on a screen via a web browser.

BRIEF DESCRIPTION OF THE SEVERAL VIEWS OF THE DRAWINGS

FIG. 1 is an exemplary form displayed by a web browser.

FIG. 4 illustrates a form helper window as may be utilized by an embodiment of the present invention.

FIG. 7 illustrates a form helper window as may be utilized by an embodiment of the present invention.

Figure 2:
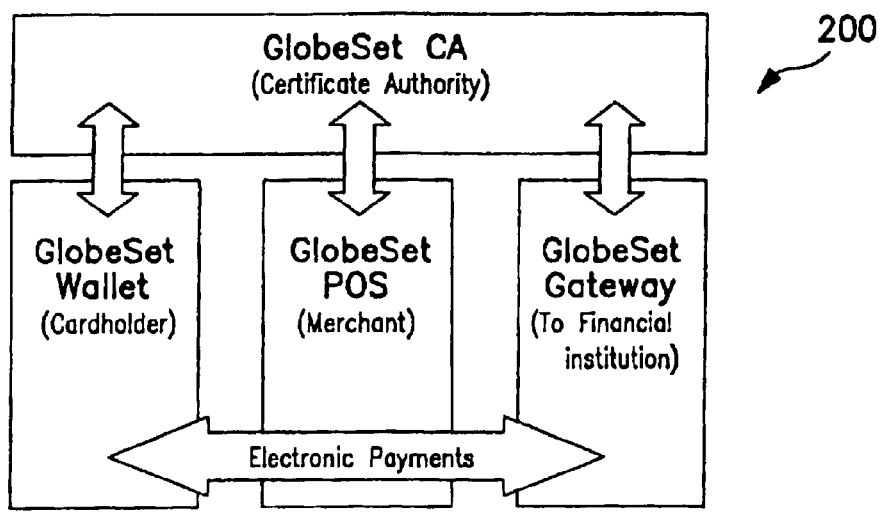
FIG. 2 illustrated a prior art wallet technology.

For ease of reference, reference numerals in the accompanying drawings typically are in the form "drawing number" followed by two digits, xx; for example, reference numerals may be numbered 3xx. In certain cases, a reference numeral may be introduced on one drawing and the same reference numeral may be utilized on other drawings to refer to the same item.

DETAILED DESCRIPTION OF THE INVENTION

Figure 3:
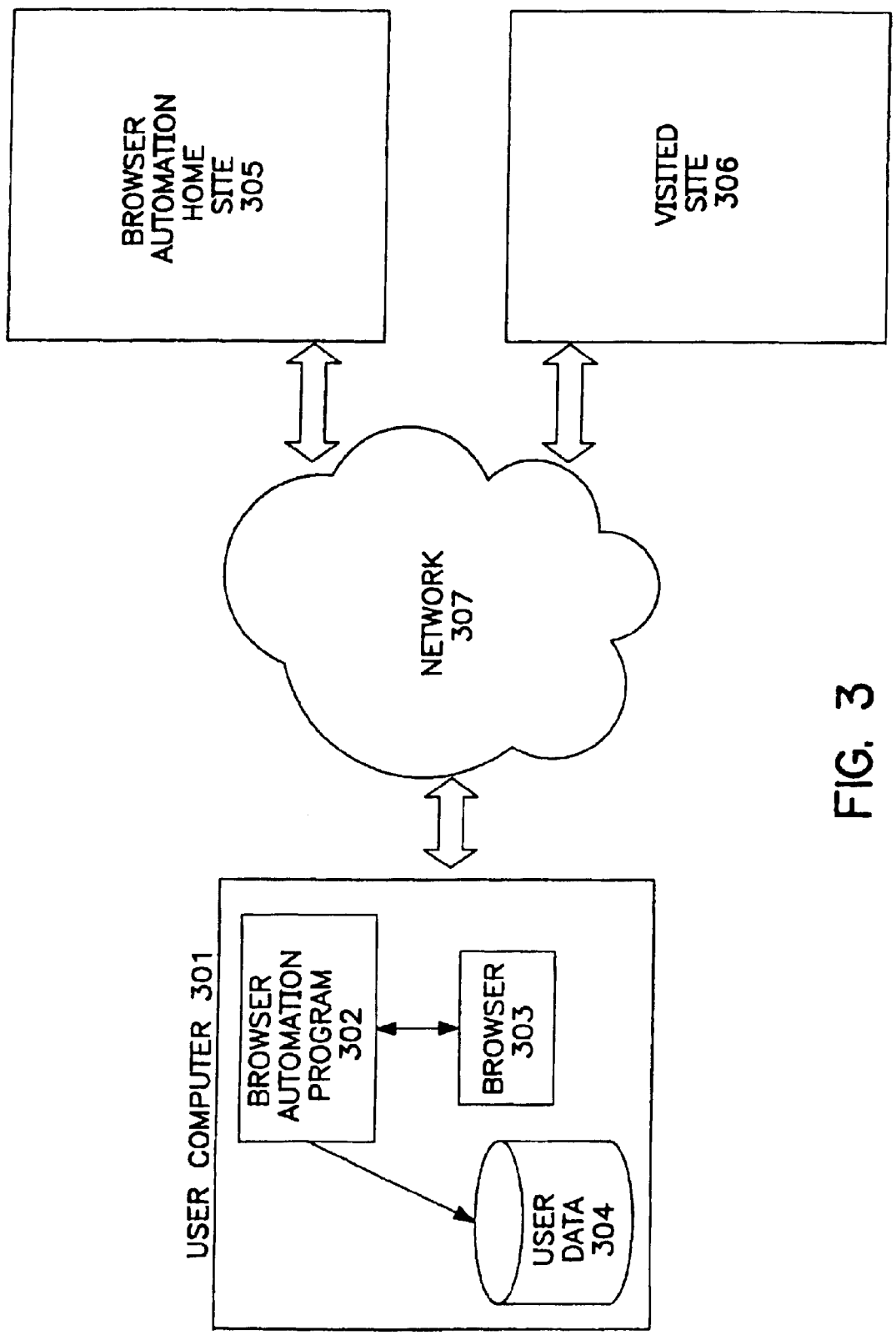
FIG. 3 illustrates a network as may utilize an embodiment of the invention.

FIG. 3 provides a diagram illustrating an overall system implementing an embodiment of the present invention. In the described embodiment, a user computing device, such as user computer 301, is automated with browser automation software 302. The browser automation software interfaces with any of a number of web browsers 303 such as Netscape Navigator available from Netscape Corporation of Mountain View, Calif. or Internet Explorer available from Microsoft Corporation of Redmond, Wash. As a user moves between web pages in the World Wide Web using browser 303, the browser automation program 302 communicates with the browser and determines the Universal Resource Locator (URL) of the web site 306 being browsed. In certain embodiments, functionality of the browser automation program 302 may be added to the browser program 303 rather than executing the automation program 302 as a separate executable program.

In the described embodiment, the browser automation program 302 may gain knowledge of the format of a form encountered on any number of web sites. For purposes of this invention, a web site for which the format of the form has been learned by the browser automation program 302 is termed a "scripted" site. One method for the browser automation program to gain this knowledge is for the user to have previously filled out the same form. The browser automation program 302 then associates the content and order of the fields for the form with the content of personal data in the user database 304 (e.g., the program 302 learns that the field named "Name" on a particular form should be associated with the user's name in the user database 304.)

A second method for the browser automation program to gain this knowledge is for the form to have been analyzed and information stored regarding the fields and expected contents. This may be done, for example, for popular or well known web sites that utilize forms. The information may be stored locally on each user's computer 301 or may be stored at a central location accessible to the user via network 307, such as the browser automation home site 305.

In an embodiment that stores this information at the home site 305, when a new URL is encountered, the home site 305 is contacted over the network 307. (It should be noted that the network could be the Internet or an intranet). In certain embodiments, information may be stored on the user's computer allowing local identification of which forms are stored at the home site 305. For example, a hash code may be developed to allow local (at the user's computer) determination of whether the form is scripted, i.e., whether information regarding the format of the form is stored, at the home site.

In addition, when encountering a form, whether for the first or a subsequent time, the browser automation program 302 may analyze the underlying structure of the form to determine if there are fields for which data is available from the user database 304. Typically, this process may involve analyzing the HyperText Markup Language (HTML), eXtensible Markup Language (XML), or other underlying code received from the visited web site 306.

Figure 4:
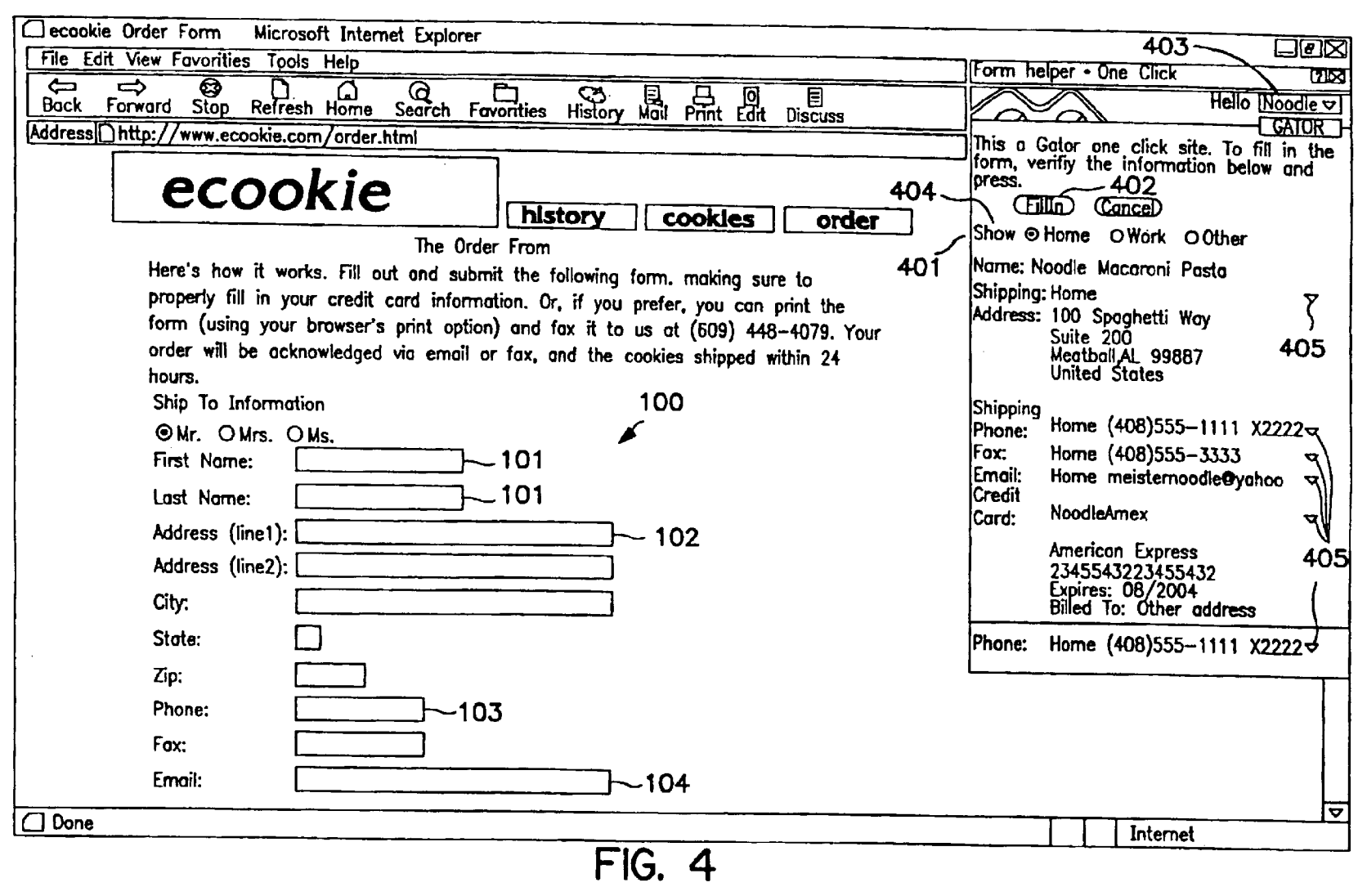
Figure 7:
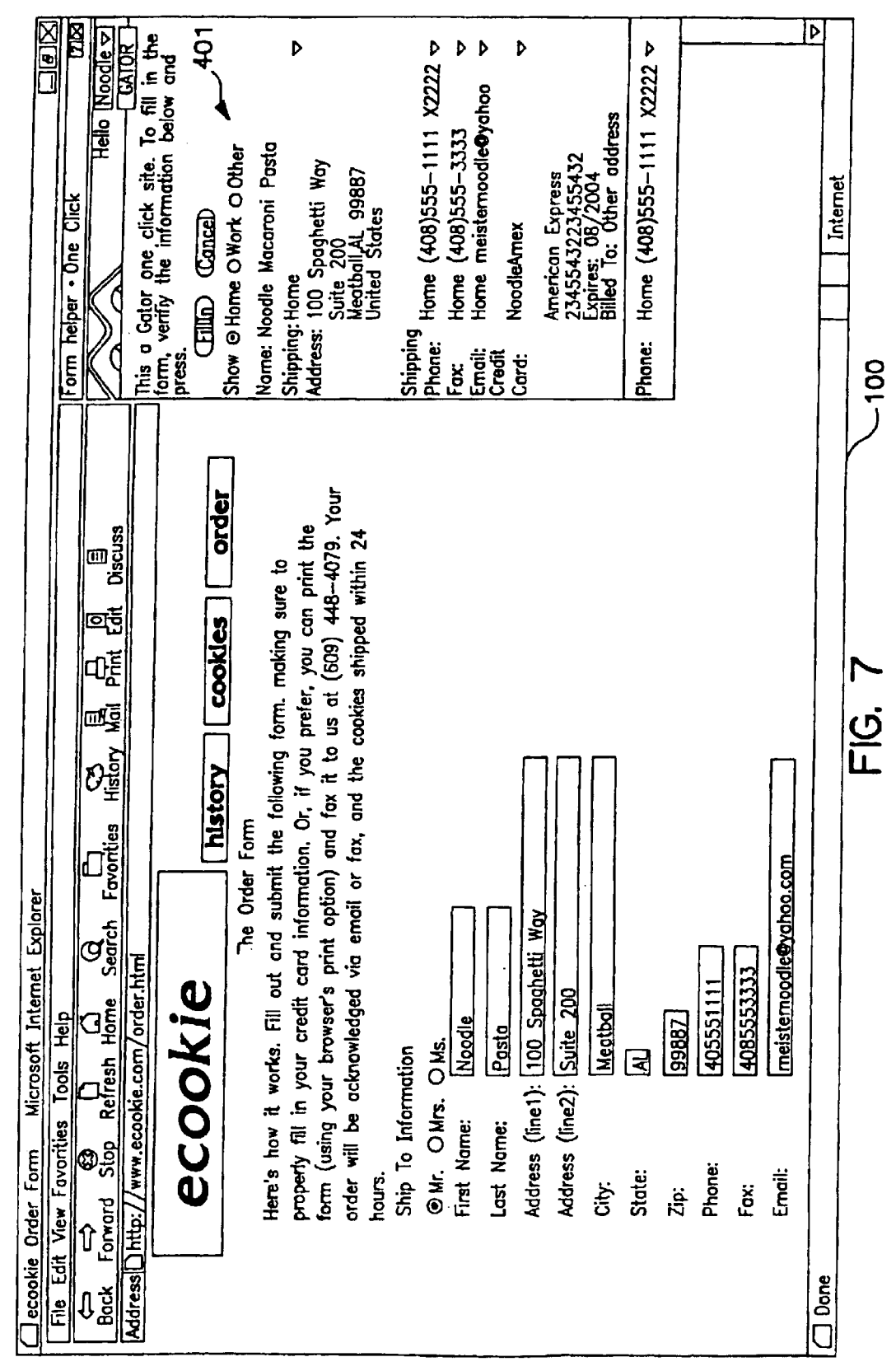

Regardless of the method, if a script is available for the form, a pop up dialog window 401 is displayed in conjunction with the visited web site. An example in FIG. 4 shows pop up window 401 overlaying a portion of a visited web site, for which a partial screen shot 100 is illustrated. The pop up window 401 allows the user to automatically place the information displayed in the fields of the pop up window into the corresponding fields of the form provided at the web page that is displayed on the screen of the user's computer. The user may supply all of the listed information in pop up window 401 or may modify some or all of it before supplying it to the form. FIG. 7 illustrates a web page form 100 filled in automatically by selecting the "fill in" button.

Figure 5:
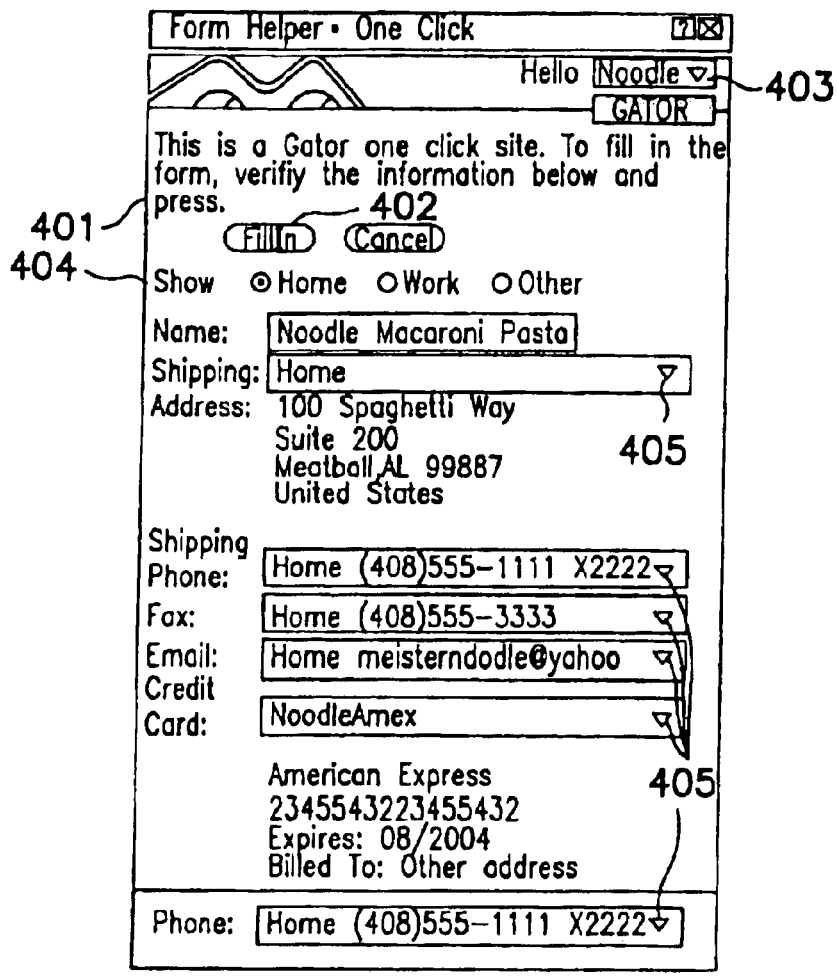
FIG. 5 illustrates a form helper window as may be utilized by an embodiment of the present invention.

The pop up window 401 is better viewed with reference to FIG. 5. The user may supply the necessary information for the form provided at the scripted site by selecting the "fill in" button 402 of pop up window 401 (assuming a script exists for the form or alternatively the program 302 can gain sufficient knowledge of the form from analyzing the underlying HTML). The "fill in" button may be selected, for example, by performing a single click of a user input device such as a mouse. Alternatively, if the browser automation program 302 is unfamiliar with the form, the user is provided with the pop up window 601 shown in FIG. 6. (FIG. 6 does not illustrate the form for which information displayed in pop up window 601 may be supplied). Pop up window 601 generally is utilized the first time a form is encountered, so that the user may select each of the individual fields in the window. The user may double click on any one particular field in pop up window 601 to supply only that field of information to the form. That information is supplied, in particular, to the currently focused field in the form displayed by the browser. The browser automation software then causes the browser to automatically advance the focus to the next field in the form, in a step wise fashion. For example, if the user double clicks on the name field 602, only the name field is supplied from the pop up window to the name field 101 in the form displayed on screen 100. Alternatively, the user may "drag and drop" the contents of a field in pop up window 601 to the corresponding field in the form displayed on screen 100.

Figure 6:
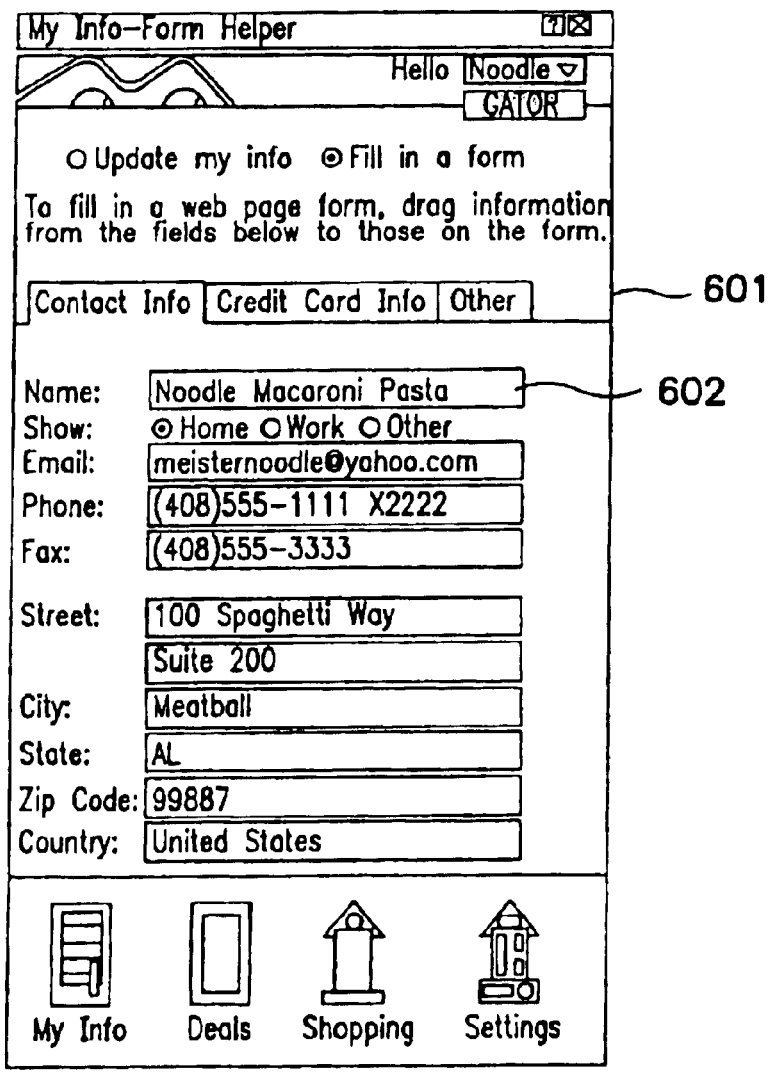
FIG. 6 illustrates a form helper window as may be utilized by an embodiment of the present invention.

It should be further noted that the pop up windows illustrated in FIGS. 5 and 6 provide for multiuser support. For example, if multiple individuals share the same computer or web browser software, information about each user may be stored and subsequently accessed by supplying a uniquely identifying user name as input to the browser automation program 302. A user can select their data by specifying their name at field 403 in pop up window 401. In one embodiment, field 403 is set up as a pull down list providing for the ability to select one of multiple users or to add a new user.

Moreover, for each user, any one of a number of profiles 404 may be provided from which to select to fill in the form. For example, the user may click on different profiles for home, work, or other. The multiple profiles allow for different sets of data to be input into the form, e.g., shipping address, phone, fax, and email address. For instance, depending on whether the user desires to communicate with the provider of the web site from home, work, or some other logical or physical designation, the user can select a desired profile to provide the appropriate information necessary for the web site provider to communicate or transact with the user accordingly. FIG. 4 illustrates the user's home profile is selected.

Yet further flexibility is provided by the browser automation program in utilizing pull down lists 405 for many of the fields of personal information accessible via pop up window 401. The user may specify one of multiple shipping addresses, phone numbers, email addresses, etc, for each profile. Thus, if a user maintains multiple offices and wishes to register or otherwise communicate personal contact information to a particular web site, the user may specify one particular office address. The user may then register at another web site using a different office address, by selecting a different office address via the pull down list associated with the shipping address field in the pop up window 401.

The information displayed in the pop up window 401 may have been initially supplied directly by the user or may have been learned as the user entered data in the normal course of filling out forms on web pages. The data is stored, typically in an encrypted format, on the user's computer 301 as user data in database 304. When the browser automation program 302 is executed, the user is asked for a password in order to access the encrypted data. In one embodiment, the data is stored in a separate file which may be copied by the user and transported from computer to computer. In one embodiment, the data within the file 304 is retained with time stamp information. Using the timestamp information, the browser automation program 302 may merge two user data files, keeping the most recent information from both files.

Figure 8:
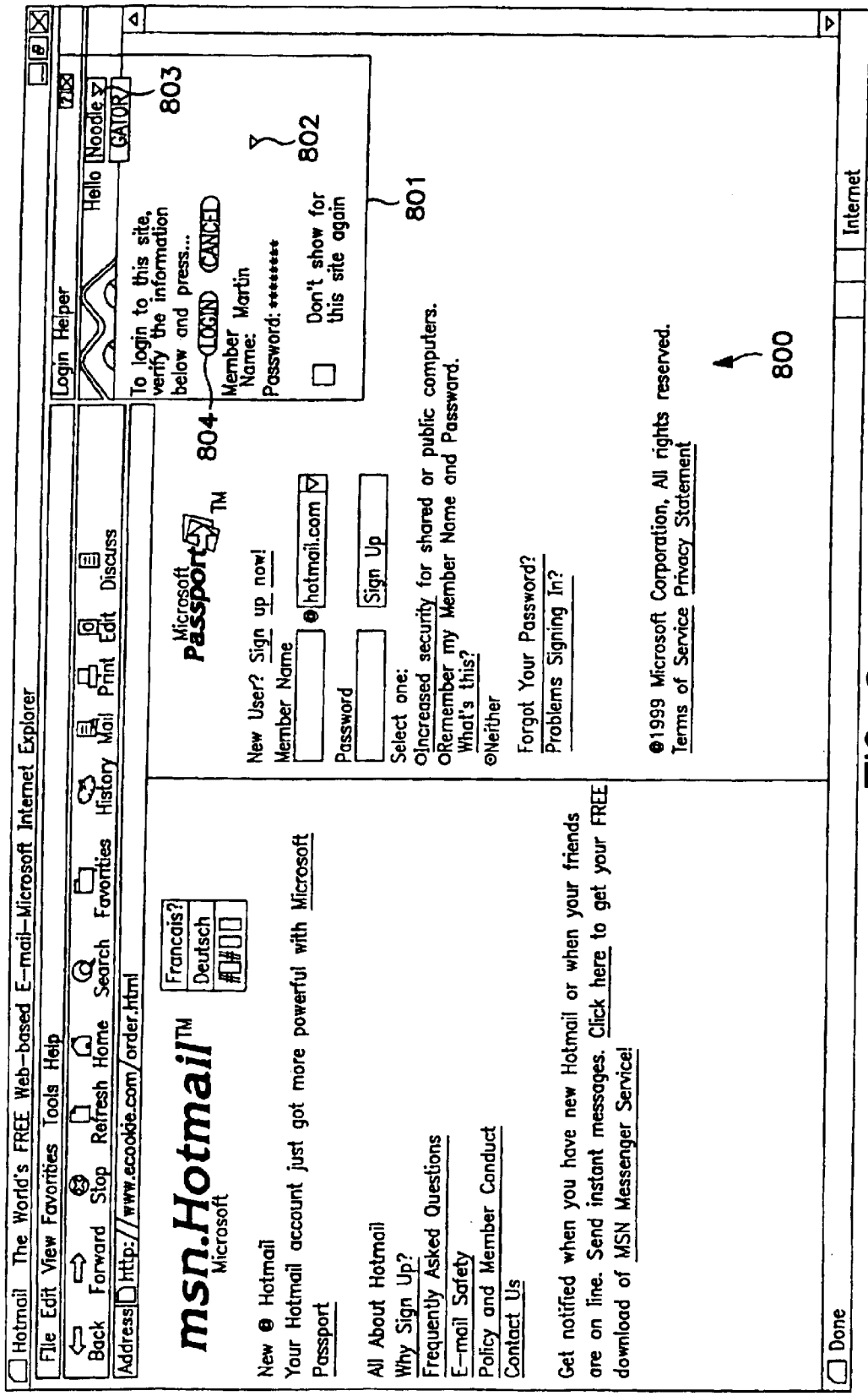
FIG. 8 illustrates a login helper window as may be utilized by an embodiment of the present invention.
Figure 9:
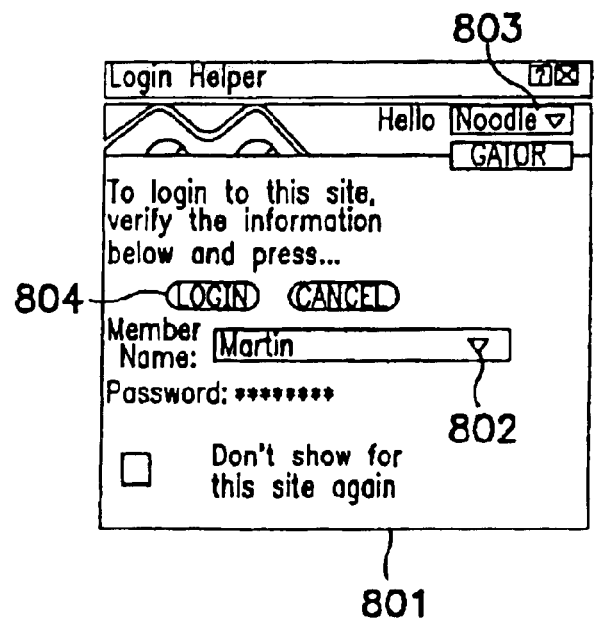
FIG. 9 illustrates a login helper window as may be utilized by an embodiment of the present invention.

In addition to assisting in completing relatively long forms as was shown in FIGS., 4–7, the browser automation program 302 can assist with other types of forms 800. An example is provided in FIG. 8 in which a "login helper" pop up dialog window 801 is displayed overlaying login screen 800. For ease of reference, dialog window 801 is shown separately in FIG. 9 as well. The browser automation program 302 has learned the user's login names and passwords for given web sites (in this case, the Microsoft msn Hotmail web site). One problem increasingly facing web users is the need to remember not only many passwords but also many user identifications, or "member names". The browser automation program stores in the user data file 304 the login member names and passwords (in an encrypted format) for sites for which the user has registered. When the user accesses the URL for a site, the user is presented with the login helper 801. Login helper 801 allows the user to select the appropriate member name and automatically then enters the correct password for the user. Of course, the user may have multiple member names for a particular site and the browser automation programs 302 store each of the various member names. The user may select the desired member name from a pull down list 802 in pop up window 801. Note also that, as in the case of pop up window 401, login helper window 801 provides for multiuser support, by allowing a user to select from one of multiple users via pull down list 803.

The user may be provided with the option of having the form filled in by selecting the login button 804, for example, via a single click of a mouse pointer device. Thus, for example, when a login form is encountered, the browser automation program 302 may fill in the form with a minimum number of keystrokes or input from the user to log in to the site.

In one embodiment, changes to the information stored in the user database 304 causes notifications to be automatically sent to web sites which have been supplied with this data. Thus, for example, if the user changes the home address information, information may be sent to those web sites which have been previously supplied with the user's home address information notifying the web sites of the change. The appropriate scripts for updating this information may be stored, for example, at the home site 305.

ALTERNATIVES TO THE PREFERRED EMBODIMENT OF THE PRESENT INVENTION

There are, of course, alternatives to the described embodiment which are within the reach of one of ordinary skill in the relevant art. The present invention is intended to be limited only by the claims presented below.

Thus, what has been disclosed is a method and apparatus for entry of form data in a web browser.

What is claimed is:

1. A method, comprising:
   receiving a request for user data, the request being presented as an electronic form;
   obtaining program code for filling in the electronic form;
   retrieving user data corresponding to a user;
   updating the user data with user data from a second location; and
   using the program code to enter at least a portion of the user data into the electronic form;
   wherein the electronic form includes multiple data fields, each field being a request for a piece of user data;
   wherein using the program code includes presenting available multiple entries for each data field on a pull-down list;
   wherein the multiple entries for each data field have been acquired in the course of filling in previous electronic forms;
   wherein the electronic form is received from a visited network site;
   wherein obtaining program code includes determining whether the program code resides in a local database utilizing a Universal Resource Locator (URL) of the visited network site obtained from a local browser, and contacting a remote database via a network to determine whether the program code resides in the remote database if the program code does not reside in the local database.

2. The method of claim 1, wherein the program code includes a script corresponding to the electronic form.

3. The method of claim 1, wherein obtaining the program code includes retrieving the program code.

4. The method of claim 3, wherein the program code is stored on a user computer.

5. The method of claim 3, wherein the program code is stored on a remote server.

6. The method of claim 1, wherein the user data is stored on a user computer.

7. The method of claim 1, wherein the user data is stored in a remote database.

8. The method of claim 1, wherein the user data is stored on a portable storage medium.

9. The method of claim 1, wherein the user data includes contact information.

10. The method of claim 1, wherein the user data includes credit information.

11. The method of claim 1, wherein using the program code includes opening a dialog window, and displaying available user data in the dialog window.

12. The method of claim 11, wherein the user data displayed in the dialog window is transferred into the electronic form after receiving a user indicator.

13. The method of claim 11, further comprising permitting the user to modify the user data displayed by the dialog window.

14. The method of claim 13, wherein the modifications are transferred to the electronic form.

15. The method of claim 1, wherein the multiple entries for each data field include available home contact information and available work contact information.

16. The method of claim 1, wherein the multiple entries for each data field include multiple credit information for a single user.

17. The method of claim 1, wherein the multiple entries for each data field have been previously supplied by the user.

18. The method of claim 1, further comprising enabling the user to transfer available user data from a dialog window to the electronic form field by field.

19. The method of claim 18, further comprising enabling the user to transfer user data from the dialog window to the electronic form by drag and drop mechanism.

20. The method of claim 18, further comprising enabling the user to transfer user data from the dialog window to the electronic form by highlighting a field in the electronic form and selecting the user data to be transferred from the dialog window.

21. The method of claim 20, further comprising, after a field has been filled, automatically advancing the cursor to focus on a subsequent field on the electronic form.

22. The method of claim 1, wherein retrieving user data includes selecting a user data set from multiple user data sets corresponding to the same user.

23. The method of claim 1, wherein the URL of the visited network site is compared against a first set of URLs for which program code is supposed to be available residing in the local database and then compared against a second set of URLs for which program code is supposed to be available residing in the remote database if the program code does not reside in the local database.

24. The method of claim 1, wherein obtaining the program code includes comparing information corresponding to the electronic form of the visited network site against information corresponding to electronic forms for which program code is supposed to be available.

25. A system, comprising:
  a browser for receiving a request for user data, the request being presented as an electronic form from a visited network site;
  a communications engine for obtaining program code, for filling in the electronic form, retrieving user data corresponding to a user, and for updating the user data with user data from a second location; and
  a processor for using the program code to enter at least a portion of the user data into the electronic form;
  wherein the communications engine retrieves the program code by comparing the electronic form of the visited network site against a first set of electronic forms for which program code is supposed to be available, the set second of electronic forms residing in a local database, and wherein the communications engine contacts a remote database via a network to compare the electronic form of the visited network site against a second set of electronic forms for which program code is supposed to be available residing in a remote database the if the communications engine cannot match the electronic form of the visited network site to the first set of electronic forms.

26. The system of claim 25, wherein the program code includes a script corresponding to the electronic form.

27. The system of claim 25, further comprising form-analyzing means for creating the program code corresponding to the electronic form during runtime.

28. The system of claim 25, wherein the communications engine obtains the program code by comparing a Universal Resource Locator (URL) of the visited network site against a first set of URLs for which program code is supposed to be available residing the local database, and compares the URL of the visited network site against a second set of URLs for which for which program code is supposed to be available residing the remote database if the URL of the visited network site does not the first set of URLs.

29. The system of claim 25, wherein the program code is stored on the user computer.

30. The system of claim 25, wherein the program code is stored on a remote database.

31. The system of claim 25, wherein the user data includes contact information.

32. The system of claim 25, wherein the user data is stored on a user computer.

33. The system of claim 25, wherein the user data is stored in a remote database on the communications engine.

34. The system of claim 25, wherein the user data is stored on a portable storage medium.

35. The system of claim 25, wherein the user data includes credit information.

36. The system of claim 25, wherein using the processor opens a dialog window, and displays available user data in the dialog window.

37. The system of claim 36, wherein the processor transfers the user data, displayed in the dialog window, into the electronic form after receiving a user indicator.

38. The system of claim 36, wherein the processor permits the user to modify the user data displayed by the dialog window.

39. The system of claim 38, wherein the processor transfers the modifications to the electronic form.

40. The system of claim 36, wherein the processor enables the user to transfer available user data from the dialog window to the electronic form field by field.

41. The system of claim 40, wherein the processor enables the user to transfer user data from the dialog window to the electronic form by drag and drop mechanism.

42. The system of claim 40, wherein the processor enables the user to transfer user data from the dialog window to the electronic form by highlighting a field in the electronic form and selecting the user data to be transferred from the dialog window.

43. The system of claim 42, wherein the processor, after a field has been filled, automatically advances the cursor to focus on a subsequent field on the electronic form.

44. The system of claim 25, wherein the electronic form includes multiple data fields, each field being a request for a piece of user data.

45. The system of claim 44, wherein the processor presents multiple entries for each data field on a pull-down list.

46. The system of claim 45, wherein the multiple entries for each data field include available home contact information and available work contact information.

47. The system of claim 45, wherein the multiple entries for each data field include available credit information for a single user.

48. The system of claim 45, wherein the processor previously acquired the multiple entries for each data field from the user.

49. The system of claim 45, wherein the processor acquired the multiple entries for each data field in the course of filling out previous electronic forms.

50. The system of claim 25, wherein the processor retrieves user data selected by a user form multiple user data sets corresponding to the same user.

51. A system, comprising:
  means for receiving a request for user data, the request being presented as an electronic form;
  means for obtaining program code for filling in the electronic form;
  means for retrieving user data corresponding to a user;
  means for updating the user data with user data from a second location; and
  means for using the program code to enter at least a portion of the user data into the electronic form;
  wherein the electronic form includes multiple data fields, each field being a request for a piece of user data;
  wherein the means for using the program code includes means for presenting available multiple entries for each data field on a pull-down list;
  wherein the multiple entries for each data field have been acquired in the course of filling in previous electronic forms;
  wherein the electronic form is received from a visited network site;
  wherein the means for obtaining program code includes means for determining whether the program code resides in a local database utilizing a Universal Resource Locator (URL) of the visited network site obtained from a local browser, and means for contacting a remote database via a network to determine whether the program code resides in the remote database if the program code does not reside in the local database.

52. A computer-readable storage medium storing program code for causing a computer to:
  receive a request for user data, the request being presented as an electronic form received from a visited network site;
  obtain program code for filling in the electronic form by determining whether the program code resides in a local database utilizing a Universal Resource Locator (URL) of the visited network site obtained from a local browser, and contacting a remote database via a network to determine whether the program code resides in the remote database if the program code does not reside in the local database;

retrieve user data corresponding to a user;

update the user data with user data from a second location; and use the program code to enter at least a portion of the user data into the electronic form;

wherein the electronic form includes multiple data fields, each field being a request for a piece of user data;

wherein using the program code includes presenting available multiple entries for each data field on a pull-down list; wherein the multiple entries for each data field have been acquired in the course of filling in previous electronic forms.

53. A method, comprising:

receiving a request for user data, the request being presented as an electronic form;

obtaining program code for filling in the electronic form;

retrieving user data corresponding to a user;

updating the user data with user data from a second location; and using the program code to enter at least a portion of the user data into the electronic form wherein the electronic form is received from a visited network site that is connected to a user computer;

wherein obtaining the program code includes comparing information corresponding to the electronic form of the visited network site against information residing in a local database that corresponds to electronic forms for which program code is supposed to be available and against information residing in a remote database utilizing if the information matching the information corresponding to the electronic form does not reside in the local database, the information including a Universal Resource Locator (URL) of the visited network site obtained from a local browser application.

54. A system, comprising:

means for receiving a request for user data, the request being presented as an electronic form;

means for obtaining program code for filling in the electronic form;

means for retrieving user data corresponding to a user;

means for updating the user data with user data from a second location; and means for using the program code to enter at least a portion of the user data into the electronic form;

wherein the electronic form is received from a visited network site that is connected to a user computer;

wherein the means for obtaining the program code includes means for comparing information residing in a local database that corresponds to the electronic form of the visited network site against information corresponding to electronic forms for which program code is supposed to be available and against information residing in a remote database utilizing if the information matching the information corresponding to the electronic form does not reside in the local database, the information including a Universal Resource Locator (URL) of the visited network site obtained from a local browser application.

55. A computer-readable storage medium storing program code for causing a computer to:

receive a request for user data, the request being presented as an electronic form;

obtain program code for filling in the electronic form;

retrieve user data corresponding to a user;

update the user data with user data from a second location; and use the program code to enter at least a portion of the user data into the electronic form;

wherein the electronic form is received from a visited network site that is connected to a user computer;

wherein obtaining the program code includes comparing information residing in a local database that corresponds to the electronic form of the visited network site against information corresponding to electronic forms for which program code is supposed to be available and against information residing in a remote database utilizing if the information matching the information corresponding to the electronic form does not reside in the local database, the information including a Universal Resource Locator (URL) of the visited network site obtained from a local browser application.

* * * * *

UNITED STATES PATENT AND TRADEMARK OFFICE
CERTIFICATE OF CORRECTION

PATENT NO. : 6,910,179 B1
DATED : June 21, 2005
INVENTOR(S) : Mark E. Pennell et al.

It is certified that error appears in the above-identified patent and that said Letters Patent is hereby corrected as shown below:

Title page,
Item [73], Assignee, change "Clarita," to -- Claria --.

Column 7,
Line 23, change "a remote database the if the communications engine cannot," to -- a remote database if the communications cannot, --.

Signed and Sealed this

Eighteenth Day of October, 2005

JON W. DUDAS
*Director of the United States Patent and Trademark Office*